United States Patent Office 3,429,693
Patented Feb. 25, 1969

3,429,693
EXTRACTION OF METALS
William C. Bauer, Boulder, and Carl K. Amano, Denver, Colo., assignors to FMC Corporation, New York, N.Y., a corporation of Delaware
No Drawing. Filed Dec. 27, 1965, Ser. No. 516,669
U.S. Cl. 75—101        10 Claims
Int. Cl. C22b *3/00;* C01f *3/00;* C01g *41/00*

ABSTRACT OF THE DISCLOSURE

The selective extraction of beryllium, vanadium, molybdenum or tungsten from gangue impurities present in the ores and concentrates of these metals is carried out by contacting these ores or concentrates with an aqueous extracting solution containing sodium carbonate and sodium bicarbonate in a molar ratio of about 1:1 dissolved in water and having a concentration of from about 1 to about 50% by weight and a pH of about 9.5 to about 10.5, maintaining the extracting solution in contact with the above ores or concentrates for about 30–480 minutes at a temperature of about 60–250° C., and recovering a metal-rich extracting solution.

---

This invention relates to the recovery of certain metals from their ores and concentrates, and more particularly, to the selective extraction of beryllium, vanadium, molybdenum and tungsten by a process which separates these metals from common gangue constituents.

The recovery of certain useful metals, namely beryllium, vanadium, molybdenum and tungsten has been complicated by the tendency of certain gangue-mineral constituents, namely, silica, alumina, iron and lime to remain with the desired metals when they are extracted from ores and concentrates. Thus, in typical acid leaching methods in which aqueous solutions of mineral acids such as sulfuric or hydrochloric are used to extract the desired metals from the ores and concentrates, the leaching solution also dissolves the undesired gangue constituents along with the metals. This necessitates having additional steps down stream from the leaching step for separating the gangue constituents from the metal. This is most objectionable because of the increased cost of operating these additional steps and because it complicates the overall processing of the ore.

Other processes have been developed that employ highly alkaline solutions of caustic, sodium carbonate or mixtures thereof as the extractant. These processes extract the desired metals and do not extract the iron and lime from the gangue. However, these highly alkaline extracting liquors do not separate the desired metals from either silica or alumina and therefore additional processing steps must be carried out to separate the silica and alumina from the extracted metal values in the resulting solutions. In addition, the highly alkaline extracting solutions do not attack the metal ores as vigorously as do the acid leaching solutions and thus lower yields of the desired metal are obtained by these processes.

As a result there is a need in the art for a method which will permit selective extraction of the above defined metals from their ores and concentrates which normally contain silica, alumina, lime and iron contaminants, yet which is simple to operate.

It is an object of the present invention to provide a process for selectively extracting beryllium, vanadium, molybdenum and tungsten from their respective ores and concentrates in a simplified manner and at low cost.

It is a further object of the present invention to provide a process whereby relatively pure aqueous extract solutions of the desired metals can be obtained in a form in which they can be used directly or easily converted to pure marketable products.

We have now found that beryllium, vanadium, molybdenum or tungsten can be selectively extracted from silicon, aluminum, iron or calcium present as gangue values in ores or concentrates of these metals by extracting the ore or concentrate with an aqueous extracting solution containing sodium carbonate and sodium bicarbonate in a molar ratio of 1:1 and having a concentration of from about 1 to 50% by weight, said extracting solution having a pH of from about 9.5 to about 10.5, said extraction being carried out at a temperature of from about 60° to 250° C. for from 30 to 480 minutes.

It is unexpected to find that the present extraction removes the desired metals, in a relatively pure state, from the undesirable gangue impurities. Normally one or more of these gangue impurities is extracted along with the desired metals in conventional acid or highly alkaline extraction procedures. As a result the extract obtained by the present invention does not normally have to be treated in additional processing steps to separate gangue impurities from the desired metal.

In carrying out the present process, the ore or concentrate is placed in a treating vessel equipped with heating and agitation means. Desirably, the treating vessel is an autoclave or other similar type of equipment in which heating can be carried out under superatmospheric pressures.

The extracting solution then is added to the ground ore or concentrate in the heating vessel, and the entire aqueous mixture is vigorously agitated. Heat is applied until a temperature of between about 60° and 250° C. has been reached. Operation at over about 100° C. requires the use of a vessel in which the contents can be heated at superatmospheric pressure. After heating for from about 30 to 480 minutes, the apparatus is cooled somewhat below the boiling temperature of the solution and the hot gases are vented off. The resultant mixture is filtered while hot and an aqueous concentrate rich in the desired metals is obtained substantially free of gangue impurities. The extract is then treated for recovery of the metal values by well-known conventional means.

The term "concentrate," as employed in the present specification and claims, is used to define natural ores or minerals which have been treated to either upgrade the concentration of the desired metals in the remaining product or to change the form or chemical nature of the ore, thereby facilitating separation of the desired metal from the gangue impurities. This would include such conventional operations as gravity separation, flotation, calcining, salt roasting, air heating (roasting), etc.

The ore or concentrate desirably is ground to −100 mesh, although ores having a particle size of up to about 28 mesh can be treated in the present process. In practice, the ore or concentrate conventionally is ground to a particle size of sufficient fineness so that it can be readily attacked by the extracting solution.

For best results, it is preferred to treat ores containing sulfides of the desired metals to a preliminary roasting operation to convert the metals to their oxide forms and remove most of the sulfur, prior to treating them by the present extraction process. This is carried out by heating the ore or concentrate to 600° to 800° C. in the presence of air. Examples of such minerals are molybdenite ($MoS_2$), patronite ($V_2S_5$), and tungstenite ($WS_2$). Where the ores being processed are of the oxide type, the desired metals are in an oxidized state and do not require any preliminary roasting treatment.

The present extracting solution is made up by mixing sodium carbonate and sodium bicarbonate in a molar ratio of about 1:1 with water. The carbonate and bicarbonate mixture is present in the extracting solution in amounts of at least 1% and preferably from about 4% to about 50% by weight. The concentration of the carbonate-bicarbonate liquor is limited only by the solubility limits of the carbonate and bicarbonate compounds in the extracting solution at the temperatures and pressures employed during extraction.

While about 4% by weight represents the preferred lower limit of the carbonate-bicarbonate concentration in the extraction solution for most of the metals to be extracted, concentrations as low as 1% have been found effective in extracting vanadium and molybdenum from low grade vanadiferous shales and molybdenum ores respectively. Dilute extracting solutions of this type are feasible where the desired metal is present in small concentrations in the ore. Dilute extracting solutions are desirable because low concentrations of the carbonate-bicarbonate compounds in the extracting solution help to further reduce the amount of gangue-mineral constituents in the extract of the desired metal.

The amount of extracting solution employed, in terms of its $Na_2O$ equivalent, is from about 2 to 15 times the theoretical amount required to react with the metal or metals to be recovered. The preferred way of adding the sodium carbonate and sodium bicarbonate is to utilize the mineral trona ($Na_2CO_3 \cdot NaHCO_3 \cdot 2H_2O$) or its purified derivative, sodium sesquicarbonate. The sodium carbonate and sodium bicarbonate exist together in a 1:1 molar ratio in the trona mineral and it provides a convenient source of these compounds for use in making up the extracting solution. The extracting mixture may be made up by dissolving trona in water and adding the solution to the treating vessel; alternately trona may be added to the heating vessel along with the ore and the required amount of water added subsequently. Where desired, chemical additives such as oxidants, e.g., oxygen, sodium chlorate, manganese dioxide, etc., which are conventionally employed with sulfide minerals, can be added to the solution to enhance the attack of the mineral during extraction of the desired metal. After proper formulation, the extracting solution should have a pH of about 9.5 to about 10.5.

In carrying out the present extraction process, the ores or concentrates and the extracting solution are subjected to vigorous agitation and heated to temperature of from about 60° to about 250° C. In general, higher temperatures are desirable because higher extraction takes place at elevated temperatures. However, in some cases, high extraction of the desired metal takes place at low temperatures, i.e., 100° C. These lower temperatures are more economical because of reduced fuel costs and because they obviate the need for operating in high pressure vessels. The extracting operation normally is carried out at from about 30 to 480 minutes. Some of the desired minerals, e.g., vanadium and molybdenum ores, require relatively short treating periods, generally on the order of about 90 minutes, while other desired minerals, notably tungsten ores, require longer periods. Wherever possible, the extraction time should be kept as short as possible, commensurate with good extraction of the desired metal, since gangue minerals become solubilized in the extracting solution over prolonged extracting periods. In general, extraction is terminated when the rate at which the desired elements dissolve in the extracting solution diminishes to uneconomical levels.

The present process can be carried out either in batch fashion or in a continuous process. In batch operations, charges of ore or concentrates are added to the reactor along with the extracting solution and reacted. The extract and solid residue are separated and the extract is treated to recover the metal. In a continuous process the extracting solution and the ore are continuously fed into a reactor and some of the residue and the extract are continuously removed and separated. The extract is treated to remove the dissolved mineral, refortified with trona to the required concentration and returned to the reactor.

When the extracting solution attacks the mineral ore or concentrate neither the iron nor the calcium values therein is attacked. As a consequence, these remain essentially unaltered in the residue. In the case of the aluminum and silica values, these are only slightly attacked by the present extracting solution. However, they remain generally insoluble by virtue of the formation of insoluble sodium-aluminum-silicate compounds. In this fashion, the present solution extracts the desired metals substantially free of the most troublesome gangue impurities, namely silicon, aluminum, iron and calcium constituents.

The metals which can be extracted by the present process and the minerals in which they are found are listed in Table I. These minerals are among the most common which can be treated by the process of the invention and are not intended to limit the scope of the process.

TABLE I

| Metal | Mineral | Mineral composition |
|---|---|---|
| Beryllium | Beryl | $3BeO \cdot Al_2O_3 \cdot 6SiO_2$ |
| Vanadium | Carnotite | $K_2(UO_2)_2(VO_4)_2 \cdot 3H_2O$ |
| | Patronite | $VS_4$ or $V_2S_5$ |
| | Vanadinite | $Pb_5(VO_4)_3Cl$ |
| Molybdenum | Molybdenite | $MoS_2$ |
| | Ferrimolybdite | $Fe_2(MoO_4)_3 \cdot 8H_2O$ |
| Tungsten | Scheelite | $CaWO_4$ |
| | Ferberite | $FeWO_4$ |
| | Wolframite | $(Fe,Mn)WO_4$ |
| | Huebnerite | $MnWO_4$ |

The leaching reaction takes place according to the following equations:

$$CaWO_4 + Na_2CO_3 \rightarrow Na_2WO_4 + CaCO_3\downarrow$$
$$V_2O_5 + 3Na_2CO_3 \rightarrow 2Na_3VO_4 + 3CO_2\uparrow$$
$$MoO_3 + Na_2CO_3 \rightarrow Na_2MoO_4 + CO_2\uparrow$$
$$BeO + Na_2CO_3 \rightarrow Na_2BeO_2 + CO_2\uparrow$$

The following examples are given to illustrate the present invention and are not deemed to be limiting thereof.

EXAMPLE 1

Run A.—A 50 g. sample was selected from each of three tungsten ores having the following tungsten and silica values.

| Constituents | Scheelite ores (wt. percent) | | |
|---|---|---|---|
| | A | B | C |
| $WO_3$ | 0.42 | 0.56 | 0.13 |
| $SiO_2$ | 51.0 | 62.0 | 46.1 |

The samples were ground to 80% −200 mesh and placed in a 2-liter autoclave equipped with an internal stirrer and an electrical heating mantle. To the pulverized ore was added 135 g. of trona and 315 g. of distilled water, thereby constituting an extracting solution of 30% by weight trona. The mixture was agitated to assure complete mixing of the ingredients in the autoclave. The autoclave was sealed, the internal stirrer was turned on, and the electric heating mantle was activated to heat the autoclave to 215° C. This temperature was maintained for 90 minutes with vigorous agitation. At the end of the heating period, the autoclave was cooled to 100° C. and the steam and gases were vented to relieve the super-atmospheric pressure in the autoclave. The hot mixture (100° C.) was then filtered on a Buchner funnel and the residue washed with three 100 ml. portions of hot water. The filtrate and washings were combined and analyzed. The results are given below in terms of the percent of the constituents extracted from the samples.

| Constituent | Percent extracted | | |
|---|---|---|---|
| | A | B | C |
| $WO_3$ | 65.0 | 100 | 100 |
| $SiO_2$ | 4.0 | 3.15 | 3.91 |

Run B.—The above procedure was duplicated except that the extraction time in the autoclave was extended to 240 minutes. The resultant filtrates were analyzed and are reported in terms of the percent of the constituents extracted from the samples.

| Constituent | Percent extracted | | |
|---|---|---|---|
| | A | B | C |
| $WO_3$ | 68.7 | 100 | 100 |
| $SiO_2$ | 3.65 | 2.15 | 4.29 |

EXAMPLE 2

The procedure of Example 1, Run A, was repeated except that a 10% by weight extracting solution was employed. This was carried out by adding 45 g. of trona and 405 g. of distilled water to the 50 g. samples of the same ores. The resultant filtrates were analyzed and are reported in terms of the percent of the constituents extracted from the samples.

| Constituent | Percent extracted | | |
|---|---|---|---|
| | A | B | C |
| $WO_3$ | 65.2 | 100 | 100 |
| $SiO_2$ | 2.92 | 3.49 | 3.25 |

EXAMPLE 3

The procedure of Example 1, Run B, was repeated on a 50 g. sample of ferberite mineral having the following tungsten and silica values:

| Constituent: | Ferberite ore, wt. percent |
|---|---|
| $WO_3$ | 35.1 |
| $SiO_2$ | 37.2 |

After extraction for 4 hours at 215° C. the filtrate was analyzed and the extraction is reported in terms of the percent of the constituents extracted from the sample.

| Constituent: | Percent extracted |
|---|---|
| $WO_3$ | 99.3 |
| $SiO_2$ | 4.52 |

EXAMPLE 4

Run A.—A 50 g. sample was selected from each of two molybdenum ores, molybdenite and ferrimolybdite. These ores had the following molybdenum and silica values.

| Constituent | Molybdenite ore, wt. percent | Ferrimolybdite ore, wt. percent |
|---|---|---|
| Mo | 0.35 | 0.13 |
| $SiO_2$ | 70.3 | 79.6 |

Each of the 50 g. samples was roasted at 750° C. for 4 hours in an electric furnace having a high air circulation. Each of the roasted samples were then placed, respectively, in a 2-liter autoclave, equipped with an internal stirrer and an electric heating mantle, along with an extracting solution containing 135 g. trona dissolved in 315 g. water. The autoclave was sealed and heated to 215° C. by means of the heating mantle. Each of the ores was then extracted for 90 minutes at this temperature with vigorous mixing. At the end of this period each of the mixtures was filtered and the filtrate was analyzed. The results of the analyses are given below in terms of the percent of the constituents extracted from the samples.

| Constituent | Percent extracted | |
|---|---|---|
| | Molybdenite ore | Ferrimolybdite ore |
| Mo | 88.5 | 86.7 |
| $SiO_2$ | 2.0 | 2.34 |

Run B.—Additional samples of the above ores were roasted as set forth above in Run A and extracted using a procedure similar to that of Run A except that the extracting solutions were made up of 4.5 g. trona dissolved in 455.5 g. water. Further, the extractions were carried out at 90° C. for 120 minutes. After the extraction periods were completed, and extracts were separated from the remaining solids and analyzed as set forth above in Run A. The results of the analyses are given below in terms of the percent of the constituents extracted from the samples.

| Constituents | Percent extracted | |
|---|---|---|
| | Molybdenite ore | Ferrimolybdite ore |
| Mo | 67.8 | 66.5 |
| $SiO_2$ | 0 | 0 |

Run C.—Additional samples of the ores were extracted in the same manner set forth in Run A except that the samples were not subjected to a pretreatment (roasting) step prior to being extracted with the trona solution. The extracts were analyzed and the results are given below in terms of the percent of constituents extracted from the samples.

| Constituent | Percent extracted | |
|---|---|---|
| | Molybdenite ore | Ferrimolybdite ore |
| Mo | 55.7 | 39.7 |
| $SiO_2$ | 2.99 | 2.0 |

Run A.—A 50 g. sample from a vanadiferous shale containing 0.75% $V_2O_5$ and 79.8% $SiO_2$ was ground to 80% —200 mesh and placed in an autoclave equipped with an internal stirrer and an electric heating mantle. An extracting solution containing 45 g. trona dissolved in 405 g. water was added to the autoclave and the ore was extracted for 90 minutes at a temperature of 215° C. The resultant extract was separated from the remaining solids, the solids were washed and the extract and washings were combined and analyzed. The analyses showed that 56% of the $V_2O_5$ values and 0.9% of the $SiO_2$ values in the ore were extracted from the sample and were present in the extract.

Run B.—The procedure of Run A was repeated except that the extracting solution contained 135 g. trona dissolved in 315 g. water. The extract was separated from the solids and the solids were washed with water. The washings and the extract were combined and analyzed. The analyses showed that 56% of the $V_2O_5$ and 2.23% of the $SiO_2$ values were extracted and were present in the extract.

EXAMPLE 6

Another sample of a high silica vanadiferous shale analyzing 0.712% $V_2O_5$ and about 75% silica was obtained. A 50 g. sample was ground to 80% —200 mesh and placed in an autoclave along with an extracting solution made up of 4.5 trona dissolved in 455.5 g. water. The extraction was carried out for 120 minutes at a temperature of 90° C. The extract was separated from the solids and the solids were washed with water. The extract and washings were combined and analyzed. The analysis indicated that 61.8% of the $V_2O_5$ present in the sample was extracted and was present in the extract.

EXAMPLE 7

Run A.—A 50 g. sample of Colorado Plateau vanadiferous clay analyzing 1.35% $V_2O_5$ was treated to a preliminary roasting at 900° C. for 3 hours in an electrically heated furnace with continuous air circulation. The roasted sample was placed in an autoclave along with an extracting solution containing 45 g. trona dissolved in 405 g. water. The extraction was carried out for 90 minutes at a temperature of 215° C. The extract was then separated from the remaining solids and the solids were washed with water. The washings and extract were combined and analyzed and found to contain 92.3% of the $V_2O_5$ content of the ore sample.

Run B.—A second sample was treated in a similar manner to that set forth in Run A, except that the extracting solution consisted of 135 g. trona dissolved in 315 g. water. Also, the extraction was carried out for 4 hours instead of 90 minutes. The resulting extract was separated from the remaining solids and the solids were washed with water. The washings and the extract were combined and analyzed and found to contain 95% of the $V_2O_5$ content of the ore sample.

EXAMPLE 8

A 50 g. sample of beryllium ore containing 0.64% BeO was ground to 80% —200 mesh and placed in an autoclave equipped with an internal stirrer and an electric heating mantle. An extracting solution containing 500 g. trona dissolved in 500 g. water was added to the autoclave and the heating mantle and internal stirrer were activated. The extraction was carried out for 240 minutes at a temperature of 215° C. The resulting extract was separated from the solids and the solids were washed with water. The washings and the extract were combined and analyzed and found to contain 16.6% of the BeO content of the ore sample.

Pursuant to the requirements of the patent statutes, the principle of this invention has been explained and exemplified in a manner so that it can be readily practiced by those skilled in the art, such exemplification including what is considered to represent the best embodiment of the invention. However, it should be clearly understood that, within the scope of the appended claims, the invention may be practiced by those skilled in the art, and having the benefit of this disclosure otherwise than as specifically described and exemplified herein.

What is claimed is:
1. The process of selectively extracting metals selected from the group consisting of beryllium, vanadium, molybdenum and tungsten from gangue impurities present in the ores and concentrates of said metals which comprises contacting a member selected from the class consisting of the ores and concentrates of said metals with an extracting solution containing a mixture of sodium carbonate and sodium bicarbonate in a molar ratio of about 1:1 dissolved in water, said extracting solution containing said mixture of sodium carbonate and sodium bicarbonate in a concentration of about 1 to about 50% by weight and having a pH of about 9.5 to 10.5, maintaining said extracting solution in contact with said ore for from about 30 to 480 minutes at a temperature of about 60° to 250° C., and recovering said metals in said extracting solution.

2. Process of claim 1 wherein the gangue impurities are silicon, aluminum, iron and calcium.

3. Process of claim 1 in which the extracting solution contains from about 1 to 50% by weight trona.

4. Process of claim 1 in which the mixture of sodium carbonate and sodium bicarbonate is present in said extracting solution in a concentration of about 4 to 50% by weight.

5. Process of claim 1 in which the metal is beryllium.

6. Process of claim 1 in which the metal is vanadium.

7. Process of claim 1 in which the metal is molybdenum.

8. Process of claim 1 in which the metal is tungsten.

9. Process of claim 1 in which said metals are extracted from ores of said metals.

10. Process of claim 1 in which said metals are extracted from concentrates of said metals.

References Cited

UNITED STATES PATENTS

| | | | |
|---|---|---|---|
| 2,063,811 | 12/1936 | Jaeger | 23—18 |
| 828,850 | 8/1906 | Haynes et al. | 23—18 |
| 1,403,477 | 1/1922 | Becket et al. | 23—15 |
| 1,261,383 | 4/1918 | Hamilton | 23—18 |
| 725,548 | 4/1903 | Ellis | 75—101 |
| 2,096,847 | 10/1937 | Donahue et al. | 23—18 |

OTHER REFERENCES

The Canadian Mining and Metallurgical Bulletin: vol. 46, issue 498, pp. 640–644, October 1953.

L. DEWAYNE RUTLEDGE, *Primary Examiner.*

TERRY R. FRYE, *Assistant Examiner.*

U.S. Cl. X.R.

23—18, 51; 75—121